Dec. 6, 1927.

J. C. CARLINE 1,651,372

PULVERIZING AND SEPARATING MACHINERY

Filed July 19, 1926     3 Sheets-Sheet 2

Dec. 6, 1927.
J. C. CARLINE
1,651,372
PULVERIZING AND SEPARATING MACHINERY
Filed July 19, 1926   3 Sheets-Sheet 3
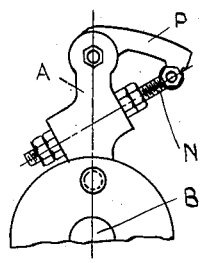
FIG. 3.
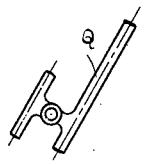
FIG. 4.
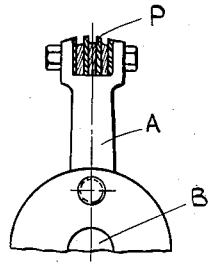
FIG. 5.
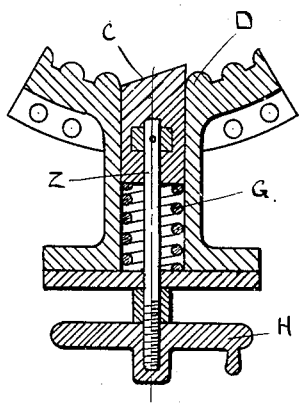
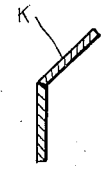
FIG. 8.
FIG. 7.
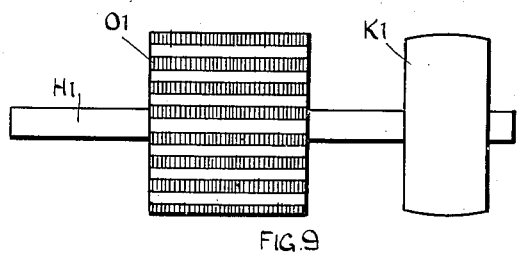
FIG. 9.
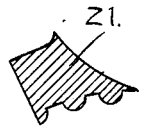
FIG. 10.
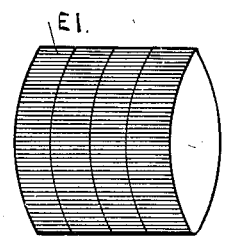
FIG. 11.
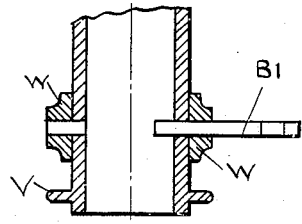
FIG. 12.
Inventor,
John C. Carline
by Herbert W. Jenner,
Attorney.

Patented Dec. 6, 1927.

1,651,372

UNITED STATES PATENT OFFICE.

JOHN CHARLES CARLINE, OF HULL, ENGLAND.

PULVERIZING AND SEPARATING MACHINERY.

Application filed July 19, 1926. Serial No. 123,369.

This invention relates to improvements in pulverizing and separating machinery for all kinds of cereals, minerals and the like of the type in which the reduction takes place within a cylindrical pulverizing chamber that is provided with attrition surfaces disposed about the preipheral walls and in which cylindrical chamber a number of rotary arms are employed in conjunction with adjustable spring beater block.

A machine built in accordance with my invention is provided with a circular chamber $(B^2)$ that is provided with inlet (F) and outlet $(C^2)$ and return orifices $(D^2)$. Through the said chamber $(B^2)$, a shaft (B) is passed, upon which rigid arms are secured and revolve with the shaft inside the circular chamber $(B^2)$. The said arms being in turn fitted with adjustable beaters (P) revolve, which during their revolutions come in contact with spring beater block (C), by which means the material being dealt with is pulverized.

The pulverizing machine is so constructed that the material is caused to enter and leave the pulverizing chamber on the periphery thereof, and travel up a spout into a revolving brusher by which it is delivered into a suitable reception chamber.

In the accompanying drawings—

Fig. 3 shows details of arms, fitted with adjustable beaters.

Fig. 4 shows a trap door.

Fig. 5 shows details of arms, fitted with serrated steel plates.

Fig. 6 shows one of the types of deflector plates.

Fig. 7 shows details of spring beater block.

Fig. 8 shows another type of deflector plates.

Fig. 9 shows details of revolving brusher.

Fig. 10 shows concave deflector.

Fig. 11 shows details of wire lining.

Fig. 12 shows how the slide is operated.

The general operation of the machine is briefly stated as follows:—

Figure 1:
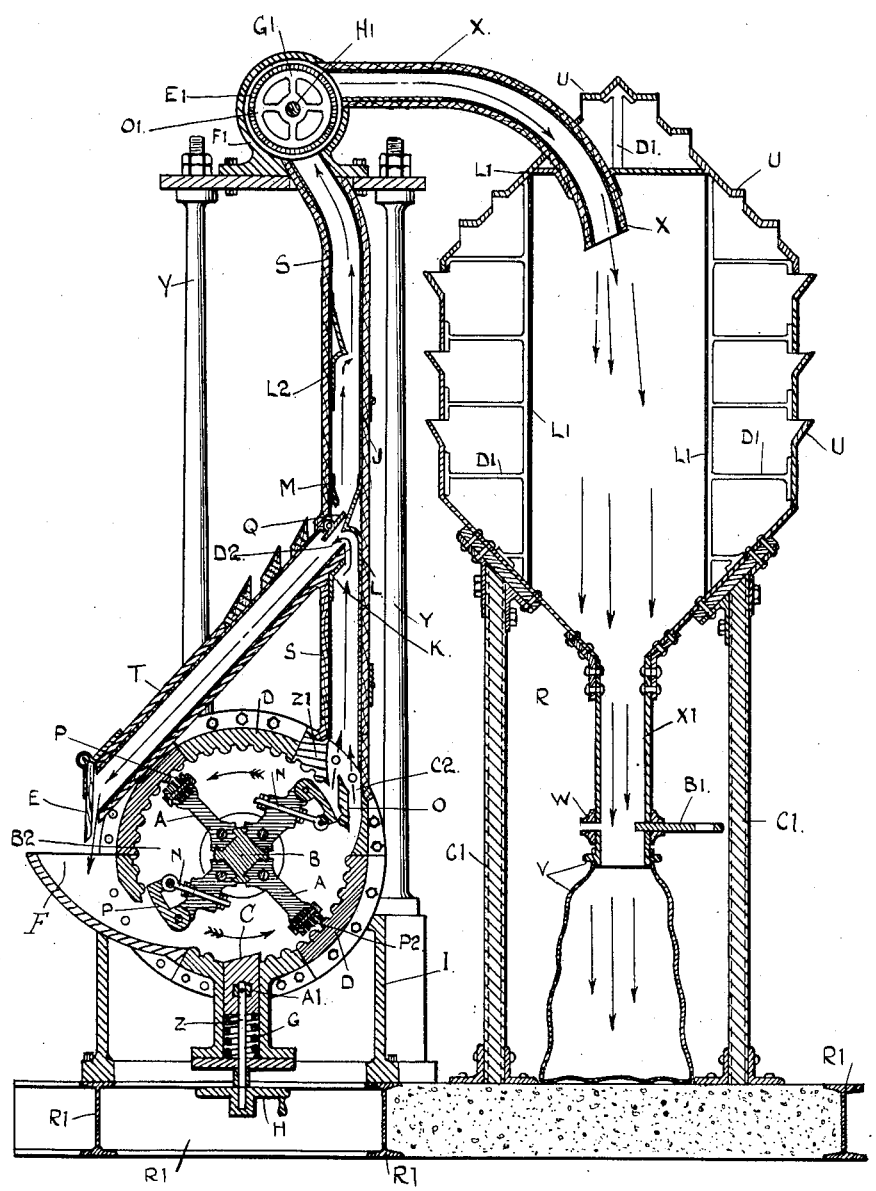
Fig. 1 shows a complete side elevation in section of the machine.
Figure 2:
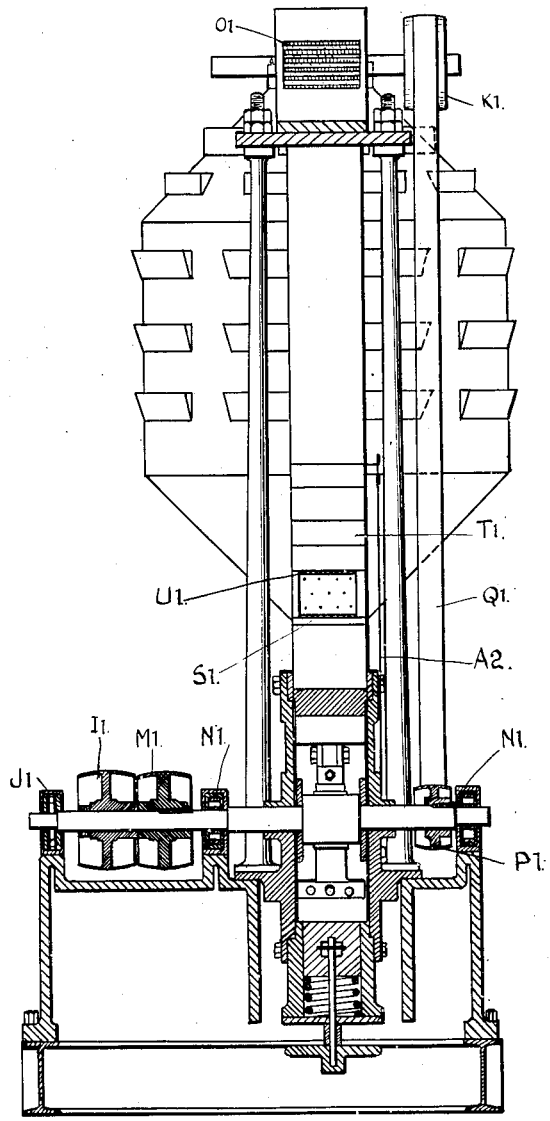
Fig. 2 shows an end elevation of the machine.

The material to be operated upon is caused to enter through the orifice (F) (Sheet 1, Fig. 1) provided on the periphery of the circular beating chamber $(B^2)$ and is pulverized by it being caught betwixt the adjustable beaters (P) and the rigid serrated steel plate beaters $(P^2)$ on the arms (A) of the revolving shaft (B) and the adjustable beater block (C) and also betwixt the projections or attrition surfaces (D) disposed about the peripheral walls of the pulverizing chamber.

The adjusting and setting up of the aforesaid beater block (C) is effected by turning hand wheel (H), or the like, which operates the threaded spindle (Z).

The material treated in chamber $(B^2)$ is directed by air current created by the revolving arms, through an orifice or the like, provided for that purpose in the top periphery of chamber $(B^2)$, the said orifice is provided with a grading bar (O) or the like, through which the material being dealt with is carried by the aforesaid air current until it comes in contact with the deflector plate (K), which directs the aforesaid pulverized material to the deflector plate (L) and trap door (Q) by which means the pulverized material is diverted down the return spout (T) back into the beating chamber $(B^2)$ to be retreated, the return flow being regulated by means of the regulator door (E).

Upon the trap door (Q) being opened by means of the lever $(A^2)$ the pulverized material is allowed to flow to pass up the main spout (S) past the deflector plate $(L^2)$ up into the revolving brusher $(O^1)$, by which means it is graded by the action of the brush $(O^1)$, against a cylindrical wire lining $(E^1)$, or other suitable lining within a cylindrical chamber $(F^1)$.

The pulverized and graded material is finally conducted by air current from the cylindrical and suitable lined chamber $(F^1)$ into any suitable chamber (R) or the like receptacle, that is fitted with a lining of a suitable fabric $(L^1)$ that is supported and secured by means of suitable stays $(D^1)$ that are in turn secured to the inside of the staving or receptacle chamber (R), the outer casing of the aforesaid staving or receptacle is provided with suitable air outlets (U).

The pulverized and graded material is finally delivered into bags or the like through the spout $(X^1)$ or the like, the said delivery being regulated by means of slides $(B^1)$ or the like that are situated at a convenient position in the aforesaid spout $(X^1)$.

Having now described my invention what I claim as new, and desire to secure by Letters Patent is:—

1. In a pulverizing machine, a beating chamber having an inlet and an outlet, attrition members secured in cylindrical form around the said chamber, a rotary beater journaled in the beater chamber and provided with radial arms, rigid serrated steel plates secured to the ends of certain of the said arms, and adjustable beaters mounted on the ends of certain other of the said arms and alternating with the rigid steel plates.

2. A pulverizing machine as set forth in claim 1, and having also a grading bar inserted in the said outlet and dividing it into passages of predetermined size.

3. In a pulverizing machine, a beating chamber having an inlet hopper at its front side and a main outlet at its rear side, attrition blocks secured in cylindrical form around the chamber, a rotary beater provided with radial beater arms and mounted on a shaft which is journaled in the said chamber concentric with the attrition blocks, a main delivery spout which projects upwardly from the main outlet, a downwardly and forwardly inclined return spout communicating with the main spout and extending crosswise over the said chamber and delivering into the inlet hopper, and plates which operate to deflect portions of the material from the main spout down the return spout and into the inlet hopper at will.

4. A pulverizing machine as set forth in claim 3, and having also a trap door at the top of the return spout for closing the communication between it and the upper part of the main spout above the return spout.

5. A pulverizing machine as set forth in claim 3, and having also a regulator door at the bottom of the return spout for regulating the return flow of material into the said inlet.

6. A pulverizing machine as set forth in claim 3, and having also deflector plates arranged in the upper part of the main spout above the return spout.

7. A pulverizing machine as set forth in claim 3, and having also a rotary brushing machine provided with an inlet at its bottom which communicates with the upper end of the said main spout, said brushing machine having also a delivery spout which projects from its upper part to deliver the fine material which does not fall back down the main spout.

In witness whereof I affix my signature.

JOHN CHARLES CARLINE.